United States Patent Office 3,490,203
Patented Jan. 20, 1970

3,490,203
PROCESS FOR SEPARATING SiCl₄ AND SiHCl₃ FROM GAS MIXTURES OF SUCH HALO-SILANES WITH HYDROGEN
Harry Kloepfer, Kapersburgweg 7, Bad Homburg; Franz Ludwig Dahm, Burstelstrasse 7, Beuggen, Gemeinde Karsau; and Erwin Bohm, Warmbacherstrasse 15, Rheinfelden, all of Germany
No Drawing. Filed Jan. 17, 1968, Ser. No. 698,418
Claims priority, application Germany, Jan. 18, 1967, D 52,041
Int. Cl. B01d $51/00$, $53/02$
U.S. Cl. 55—71                                    12 Claims

ABSTRACT OF THE DISCLOSURE

Separation of $SiCl_4$ and $SiHCl_3$ from gaseous mixtures thereof with hydrogen by cooling such mixtures to temperatures at which a portion of such halosilanes condense and are removed in liquid form and then treating the remaining gas mixture with an inert liquid absorbent for said silanes and after desorption recovering the halosilanes in liquid form.

BACKGROUND OF THE INVENTION

The invention relates to an improved process for separating $SiCl_4$ and $SiCHl_3$ from gaseous mixtures thereof with hydrogen.

The separation of silicon chlorides from gas mixtures consisting of such silicon chlorides and hydrogen, such as, for example, are obtained in the chlorination of ferrosilicon which have been prepurified to remove any aluminum chloride and titanium chloride contained therein, is of considerable technical and economic significance in the production of finely divided silicon dioxide by pyrolytic decomposition of silicon chlorides. As special qualities of the end product are required in the synthetic production of the finely divided silicon dioxide, it is not possible to avoid the necessity of separating the gas mixtures into their components, namely, hydrogen and liquid silicon chlorides. The separation of the silicon chlorides is subsequently effected by known procedures.

Various methods are available for the separation of the silicon chlorides from the gas mixture which can be divided into two groups: (1) low temperature cooling (condensation) and (2) absorption processes. Both groups of processes are impractical from an economic point of view for the following reasons:

(1) In the low temperature cooling processes, temperatures of —70° C. to —80° C. are necessary in order to obtain hydrogen which is sufficiently free of silicon chlorides. Such temperatures can only be attained with multi-step refrigeration equipment.

(2) The known absorption processes in which the absorption is effected in aliphatic, acrylic and cyclic hydrocarbons from which the double bonds have been removed by treatment with oleum are not suited when large portions of silicon chlorides must be separated from the hydrogen.

In absorption processes involving larger quantities of silicon chlorides the heat of absorption which is set free during adiabatic operation of the absorption causes a substantial increase in temperature of the absorption liquid and thereby a considerable decrease in its specific absorption capacity. As a result the quantities of absorption liquid which are recycled become very large. This has the further result that the following distillative separation of the silicon chlorides for the absorbent liquid correspondingly requires greater expense. In isothermal operation considerable quantities of heat have to be removed during the absorption. Cooling of the absorber is hard to carry out as the film flowing down the cooling surfaces is vicous and insulating and therefore reduces the heat exchange considerably.

SUMMARY OF THE INVENTION

It is an object of the invention to provide a process for the separation of $SiCl_4$ and $SiHCl_3$ from a gas mixture of these silicon halides and hydrogen using absorption of the silicon chlorides in organic or inorganic liquids which are inert with respect to such silicon chlorides but have the ability to dissolve such silicon chlorides with subsequent desorption of the silicon chlorides which substantially reduces the disadvantages of the processes mentioned above.

The essence of the invention resides in that the condensation process and the absorption process are combined by first cooling the gas mixture to a temperature at which a portion of the silicon chlorides content condenses and is drawn off in liquid form and in a second step treating the remaining gas mixture with an absorption liquid to absorb the remaining silicon chlorides content which after desorption is recovered in liquid form. Surprisingly, the combination of the two processes results in considerable economic advantage.

DETAILED DESCRIPTION OF THE INVENTION INCLUDING PREFERRED EMBODIMENTS

In carrying out the combined process according to the invention the gaseous hydrogen-$SiCl_4$-$SiHCl_3$ is first of all cooled down to temperatures between $+15$ and $-25°$ C., preferably between $0°$ and $-15°$ C., at atmospheric pressure whereby the major portion of the condensible constituents are removed from such gas mixture and then the remainder of the chlorosilane content is separated therefrom by absorption also at lower temperatures of $+40°$ to $-30°$ C., preferably $+10°$ to $-20°$ C., followed by desorption. In the temperature range of both process steps concerned it is possible to effect the cooling with simple technical expedients, in general with single step compressor equipment. The gas mixture which is to be cooled can be passed either counter-currently or preferably concurrently with the condensate which runs off as in this instance a larger portion of the more volatile $SiHCl_3$ is condensed.

The use of the condensation procedure as the first step renders it possible to carry out the following absorption adiabatically while at the same time keeping the quantity of absorption liquid which has to be recycled small. Also the cost of the subsequent distillative separation (desorption) of the absorption liquid and the silicon chlorides is considerably less.

The absorption liquid employed according to the invention must be inert with respect to the $SiCl_4$ and $SiHCl_3$ and have good solvent capacity for such silicon chlorides. The vapor pressure of the absorption liquid at the absorption temperature at the gas outlet must be sufficiently low that only very low losses are encountered. Aliphatic, cyclic and aromatic hydrocarbons or halogenated hydrocarbons whose boiling point, at atmospheric pressure or moderately raised pressures, is in a range of 110 to 250° C. and preferably of 130 to 180° C. can be used as the absorption liquids. Absorption liquids having a high content of xylene, trimethylbenzene and/or tetramethylbenzene have proved particularly advantageous. In addition, inorganic absorption liquids which are inert with respect to $SiCl_4$ and $SiHCl_3$ and have the other properties specified above, such as, for example, the siloxanes, for instance $Si_2OCl_6$, $Si_3O_2Cl_8$ or mixtures thereof, can be used.

The following examples will serve to illustrate the invention, but the invention is not limited to the conditions given therein by way of example.

Example 1

A gas mixture consisting of 26.8 Nm.³/h. $H_2$, 79.4 kg./h. (=10.4 Nm.³/h.) $SiCl_4$ and 16.9 kg./h. (=2.8 Nm.³/h.) $SiHCl_3$ at an absolute pressure of 900 mm. Hg was passed downwardly through an upright cooler 150 mm. in diameter and 1500 mm. long (cooling surface area 1.6 m.²) which was cooled with a cooling brine at −5° C. so that its temperature was reduced from 30° C. to 0° C. The gas mixture flowed through the cooler concurrently with the condensate which ran off. 62.8 kg./h. of $SiCl_4$ and 9.4 kg./h. of $SiHCl_3$ were separated off in liquid form.

The remaining gas mixture which had been cooled to 0° C. and consisted of 26.8 Nm.³/h. $H_2$, 16.6 kg./h. (=2.18 Nm.³/h.) $SiCl_4$ and 7.4 kg./h. (=1.22 Nm.³/h.) $SiHCl_3$ was then passed upwardly through an absorption column 120 mm. in diameter and 3 meters long filled with 15 mm. Raschig rings. 94 kg./h. of trimethylbenzene which still contained 1.8 kg./h. of $SiCl_4$ and 0.2 kg./h. of $SiHCl_3$ were supplied to the head of the column. The temperature of the absorption liquid at the head of the column was maintained at 0° C. The absorption was carried out adiabatically.

The gas leaving the head of the absorption column consisted of 28.8 Nm.³/h. $H_2$, 0.4 kg./h. $SiCl_4$, 0.1 kg./h. $SiHCl_3$ and 0.1 kg./h. trimethylbenzene. This silicon halides content corresponds to a dew point of −70° C. and is tolerable in the further use of the gas mixture.

The liquid mixture leaving the bottom of the absorption column consisting of 93.9 kg./h. trimethylbenzene, 18.0 kg./h. $SiCl_4$ and 7.5 kg./h. $SiHCl_3$ was subjected to rectification so as to remove all but 1.8 kg./h. $SiCl_4$ and 0.2 kg./h. $SiHCl_3$, then cooled to 0° C. and recycled to the absorption column.

Example 2

The same apparatus was employed as in Example 1 and the same starting gas mixture was employed but it was cooled at a 900 mm. Hg absolute pressure from 30° C. to −15° C. whereby 73 kg./h. $SiCl_4$ and 13 kg./h. $SiHCl_3$ were separated off in liquid form in the first step.

The remaining gas mixture consisting of 26.8 Nm.³/h. $H_2$, 6.4 kg./h. $SiCl_4$ and 3.9 kg./h. $SiHCl_3$ was passed countercurrently under adiabatic conditions of 43 kg./h. of $SiCl_4$ and $SiHCl_3$ free xylene which had been precooled to −15° C. The gas mixture leaving the head of the column had an $SiCl_4$ and $SiHCl_3$ content corresponding to a dew point below −70° C. The liquid mixture leaving the bottom of the column consisted of 42.9 kg./h. xylene, 6.4 kg./h. $SiCl_4$ and 3.9 kg./h. $SiHCl_3$. The mixture was subjected to rectification and the $SiCl_4$ and $SiHCl_3$ free xylol recovered cooled to −15° C. and recycled to the absorption column.

Example 3

The procedure of Example 2 was repeated except that hexachlorodisiloxane was used as the absorption liquid instead of xylene. The operating conditions and the purity of the residual gas were the same as in Example 2. The quantity of hexachlorodisiloxane recycled amounted to 107 kg./h.

We claim:
1. A method for separating $SiCl_4$ and $SiHCl_3$ from gas mixtures of such chlorosilanes and hydrogen which comprises the combination of (1) cooling such a gas mixture to temperatures below the dew point of the chlorosilanes at which a substantial portion of $SiCl_4$ and $SiHCl_3$ content is condensed and drawing off the condensed liquid $SiCl_4$ and $SiHCl_3$ and (2) then contacting the remaining gas mixture with an absorption liquid inert with respect to the $SiCl_4$ and $SiHCl_3$ but having substantial solvent capacity therefor to absorb at least substantially all of the remainder of the $SiCl_4$ and $SiHCl_3$ content of such gas mixture.

2. The method of claim 1 in which the condensation in step 1 is carried out at a temperature between about 15° and −25° C.

3. The method of claim 1 in which the condensation in step 1 is carried out at a temperature between about 0° and −15° C.

4. The method of claim 2 in which said gas mixture while being cooled in the first step is passed concurrently with the condensate which is formed.

5. The method of claim 2 in which the absorption liquid has a boiling point between 110 and 250° C.

6. The method of claim 4 in which said absorption liquid has a high content of at least one methyl benzene selected from the group consisting of xylene, trimethylbenzene and tetramethylbenzene.

7. The method of claim 5 in which said absorption liquid is a chlorosiloxane.

8. The method of claim 7 in which said adsorption liquid is selected from the group consisting of hexachlorodisiloxane and octachlorotrisiloxane and mixture thereof.

9. The method of claim 5 in which the absorption in step 2 is carried out adiabatically and countercurrently.

10. The method of claim 9 in which the temperature of the absorption liquid supplied is between about +40 and −30° C.

11. The method of claim 9 in which the temperature of the absorption liquid supplied is between about +10 and −20° C.

12. The method according to claim 5 wherein the absorption liquid is a member selected from the group consisting of aliphatic, cyclic, aromatic hydrocarbons and halogenated hydrocarbons.

References Cited

UNITED STATES PATENTS

| | | | |
|---|---|---|---|
| 2,843,458 | 7/1958 | Beattie et al. | 23—205 |
| 3,021,922 | 2/1962 | Dance et al. | 23—205 |

FOREIGN PATENTS

| | | |
|---|---|---|
| 866,002 | 4/1961 | Great Britain. |

OTHER REFERENCES

Jenkner, German application No. 1,160,412, pub. Jan. 2, 1964.

REUBEN FRIEDMAN, Primary Examiner

C. N. HART, Assistant Examiner